(12) United States Patent
Augsburg et al.

(10) Patent No.: US 6,513,134 B1
(45) Date of Patent: Jan. 28, 2003

(54) SYSTEM AND METHOD FOR TRACING PROGRAM EXECUTION WITHIN A SUPERSCALAR PROCESSOR

(75) Inventors: Victor Roberts Augsburg, Apex, NC (US); Jeffrey Todd Bridges, Raleigh, NC (US); Thomas Andrew Sartorius, Raleigh, NC (US); Rodney Wayne Smith, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/397,293

(22) Filed: Sep. 15, 1999

(51) Int. Cl.[7] .................................................. H02H 3/05
(52) U.S. Cl. ........................ 714/38; 712/227; 717/127; 717/128
(58) Field of Search ............................... 714/38, 39, 30, 714/45; 712/234, 227; 717/127, 128, 129; 702/182, 183

(56) References Cited

U.S. PATENT DOCUMENTS

| | | | | |
|---|---|---|---|---|
| 5,121,489 A | * | 6/1992 | Andrews | 714/35 |
| 5,359,608 A | * | 10/1994 | Belz et al. | 714/38 |
| 5,418,917 A | * | 5/1995 | Hiraoka et al. | 712/234 |
| 5,642,479 A | * | 6/1997 | Flynn | 714/45 |
| 5,764,884 A | * | 6/1998 | Van Fleet | 714/38 |
| 5,809,293 A | * | 9/1998 | Bridges et al. | 712/227 |
| 5,933,626 A | * | 8/1999 | Mahalingaiah et al. | 712/227 |
| 5,944,841 A | * | 8/1999 | Christie | 714/38 |
| 5,996,092 A | * | 11/1999 | Augsburg et al. | 712/227 |
| 6,247,146 B1 | * | 6/2001 | Wheatley et al. | 712/236 |
| 6,253,338 B1 | * | 6/2001 | Smolders | 712/227 |

* cited by examiner

*Primary Examiner*—Robert Beausoleil
*Assistant Examiner*—Yolanda L. Wilson
(74) *Attorney, Agent, or Firm*—Carlos Munoz-Bustamente

(57) ABSTRACT

A system and method for tracing program code within a processor having an embedded cache memory. The non-invasive tracing technique minimizes the need for trace information to be broadcast externally. The tracing technique monitors changes in instruction flow from the normal execution stream of the code. Various features, individually and in combination, provide a real-time trace-forward and trace-back capability with a minimal number of pins running at a minimal frequency relative to the processor.

26 Claims, 8 Drawing Sheets

SYSTEM AND METHOD FOR TRACING PROGRAM EXECUTION WITHIN A SUPERSCALAR PROCESSOR

TECHNICAL FIELD

The present invention relates in general to data processing systems, and in particular, to program execution tracing within a superscalar processor.

BACKGROUND INFORMATION

The present invention addresses the need to acquire a real-time trace of program execution from a high performance superscalar microprocessor. Typically, users wish to obtain a "trace" or listing, of exactly what instructions execute during each clock cycle for a limited period of time during the execution of a program in order to debug or analyze the performance of the program. A "real-time" trace is one that can be acquired while the program runs at normal speed, in the actual system environment, and can be triggered by some system event recognized by the trace acquisition system. Note that since any buffer used to acquire a trace will have a finite number of entries that will likely be much smaller than the number of clocks consumed in the execution of the program, the trace acquisition system must be able to selectively retain only the information for the clock cycles of interest, i.e., those just before and just after the "trigger" event ("TE"). Further, the system must provide a means for synchronizing the TE with the contents of the trace buffer so that the user can tell exactly what instructions were executing during the clock cycle that the TE occurred. A "non-invasive" trace is one that can be acquired without disturbing the timing behavior of the program from its behavior while not being traced.

A difficulty in acquiring a trace from a highly integrated processor stems from the invisibility of most of the signals required to derive the trace. A typical approach to deriving an instruction trace requires one to determine the location of an instruction being executed on a particular clock cycle (i.e., at the start of the trace), and then to determine for subsequent clock cycles how many instructions are executed, whether they are taken or not if they are branches, and the target addresses for the taken branches.

Because the processor has an integrated instruction cache, the instruction address bus is not accessible externally and hence, each instruction fetch cannot normally be seen. Also, the signals that indicate the number of instructions executed each cycle and the direction taken by conditional branches are not usually available externally to the integrated circuit ("IC"). Therefore, some information must normally be exported from the microprocessor in order to acquire the trace. This information should appear on the external pins of the IC; either on pins that are already used for other purposes such as external data and address buses, or on pins dedicated to the tracing function.

Multiplexing trace data onto existing pins has two potential problems. If the trace runs all the time, it will contend for system resources (e.g., bus bandwidth), degrading performance to support a feature that is only used during software debug operations. If the trace data is switched on only when acquiring a trace, it may affect the timing of the program by delaying the processor's normal access to the shared pins, and thus will be intrusive. Dedicated pins can alleviate this problem; however, to maintain low cost of the IC, the pin count must be kept as low as possible.

U.S. patent application Ser. No. 08/760,553, which is hereby incorporated by reference herein, disclosed a set of hardware additions made to a microprocessor to provide a non-intrusive, real-time trace capability with low additional costs to the processor. However, that trace solution was operable for low-mid performance, single-issue microprocessors running at frequencies below 100 MHz, such that the external pin requirements were minimal. In contrast, high-performance, superscalar microprocessors present new challenges for design and innovation. These processors run at aggressive frequencies (over 400 MHz) and have the ability to complete multiple instructions in a given cycle. This results in several related problems. External trace probes (or logic analyzers) have difficulty collecting data at the higher frequencies, so trace information must broadcast at a fraction of the processor frequency. In order to maintain data bandwidth at this reduced frequency, the number of trace pins must be increased. In addition, the completion of multiple instructions in a given CPU (central processing unit) cycle increases the data bandwidth requirements, further increasing the number of pins required to maintain that bandwidth. Pins come at a high cost, as many ASICs (application specific integrated circuits) that incorporate cores will be I/O (input/output) constrained. That is, there will not be enough pins on the periphery of the chip to support internal logic. Although customers want real-time trace capabilities, there is significant pressure to reduce the I/O requirements for the trace function, since it is primarily used for debugging code during development and is not used by the end application. This need to acquire real-time trace of program execution from a high-performance, superscalar microprocessor presents special problems due to increases in operating frequency and data volume.

SUMMARY OF THE INVENTION

The present invention addresses the foregoing need by providing a novel combination of features, which allow a high-performance superscalar microprocessor to provide real-time trace-forward and trace-back capability with a minimum number of pins running at a minimal frequency relative to the processor frequency. The present invention provides for the gathering into trace buffers of information on indirect branch targets, interrupt vectors, periodic synchronizing event information, fence and trigger event codes, and instruction (including branches) and interrupt completion information. The present invention then encodes and broadcasts the aforementioned information using a minimum number of pins and at a minimal frequency to enable reconstruction of the real-time execution path by external trace software. The present invention further limits or prevents the occurrence of certain instruction processing combinations over a given range of CPU cycles, such occurrences including the number of completing branches, the number of interrupts, and the occurrence of an interrupt with a certain number of completing instructions.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

Figure 1:
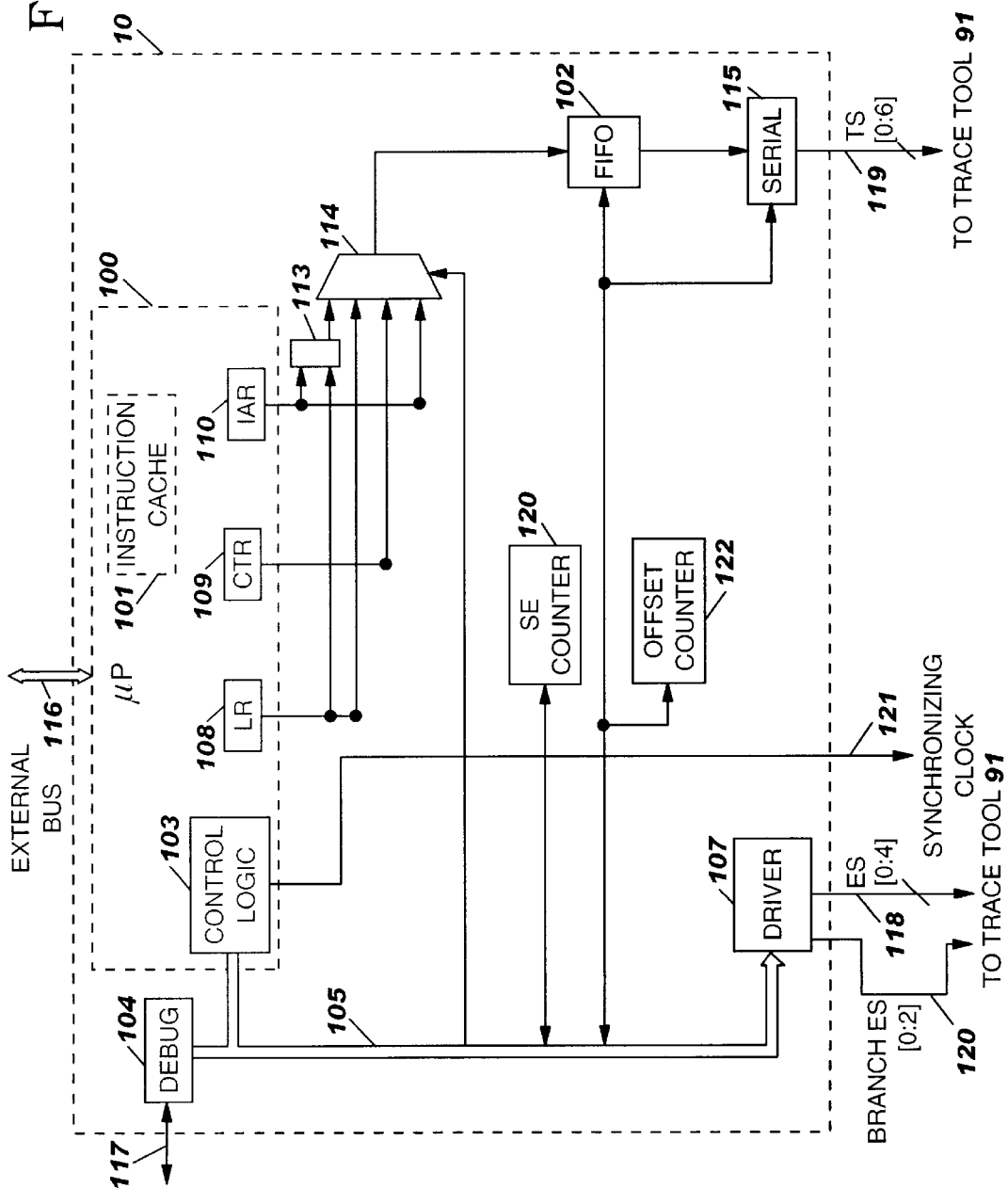
FIG. 1 illustrates a diagram of an embodiment of the present invention for performing tracing of a typical microprocessor.

In the following description, numerous specific details are set forth such as clock frequencies, processor brands and types, specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

In order to completely reconstruct an instruction trace, the user must be able to determine whether any instructions are executed on each clock cycle being traced, and the address of any such instructions. The system described within this application operates by dedicating a few pins to the trace function and by broadcasting a data stream on those pins, which allows the external acquisition system to reconstruct the trace.

High-performance, superscalar embedded processor cores are designed for operating frequencies of 400 MHz and beyond, and can complete multiple instructions per cycle. The present invention is operable, but not limited to, with PowerPC processor technology available from International Business Machines Corp. This is more complex than previous processor designs (which utilize the trace method disclosed in the above-referenced Ser. No. 08/760,553), which operate in the 100 MHz range and can complete no more than 4 instructions in 4 processor cycles. Although the present implementation incorporates some of the general concepts from Ser. No. 08/760,553, the added frequency and instruction completion bandwidth make it more difficult to trace, and the concepts described herein are required.

Referring to FIG. 1, there is illustrated a block diagram of an embodiment of the present invention. Integrated circuit 10 includes logic for performing the tracing of program code running out of an embedded cache (instruction cache 101) within microprocessor 100 (see FIG. 6).

Shadow lines 10 embody elements of the present invention which may be incorporated on a single silicon chip.

Microprocessor 100 may comprise any one of the numerous commercially available microprocessors, e.g., the PowerPC microprocessor. It is to be assumed that microprocessor 100 contains all the usual and well-known microprocessor elements and functionality and performs in the usual manner. Microprocessor 100 includes embedded instruction cache 101; microprocessor 100 can execute code residing in cache 101, or an on-chip memory (not shown), without accessing external memory 604 (see FIG. 6) through external bus 116.

Link register ("LR") 108 is an architected capture register used to provide a branch target address for a "branch conditional to link register" instruction, and to hold the return address after "branch and link" instructions. LR 108 is typically used for subroutine CALL/RETURN sequences within microprocessor 100.

Instruction address register ("IAR") 10 (commonly known as the program counter) is a capture register that contains the address of the current instruction being executed within microprocessor 100 at any one point in time.

Registers 108–110 are architected registers that are typical in microprocessor designs. LR 108 is software accessible using the instructions mtlr and mflr, which are well-known in the art. These instructions move values between this register and general purpose registers within microprocessor 100. LR 108 is also used by the bclr branch instruction as a branch target, or as in the case of the bcl, bclrl, or bcctrl, LR 108 stores the return address to be used at a later time. Again, such instructions are well-known in the art. IAR 110 is an internal processor resource that is used to keep track of the instruction address that is currently being executed. As a result of the above, registers 108–110 are physically accessible by the present invention in well-known manners.

Mux 114 multiplexes contents from LR 108, CTR 109, IAR 110 and latch 113 for input into FIFO 102, which is a trace FIFO used to store trace address information for later output to the trace tool (see FIG. 9). Mux 114 and FIFO 102 may consist of commercially available multiplexers and FIFOs, which are known to those skilled in the art.

Figure 9:
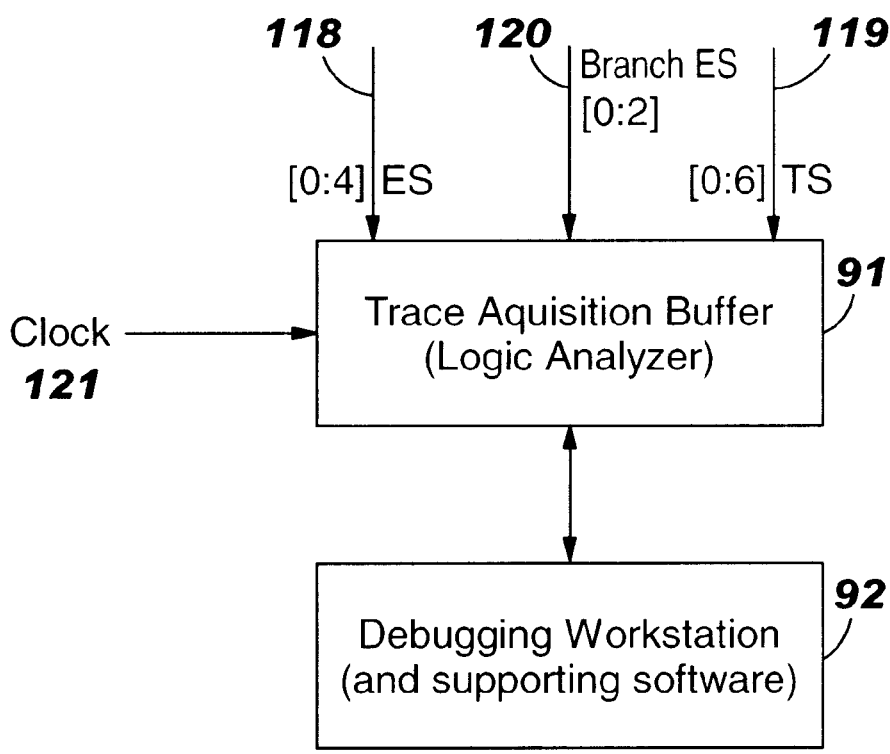
FIG. 9 illustrates a trace acquisition buffer and a debugging workstation.

Trace serialization logic ("Serial Circuit") 115 serializes the trace FIFO data received from FIFO 102 for serial broadcast over a 7-bit bus 119 to the trace tool (see FIG. 9).

Debug logic circuit 104 provides an interface in-between circuit 10 and a user for allowing various trace events to be enabled. Trace events may also be enabled via software executed within the data processing system employing circuit 10 via bus 116 (see FIG. 6).

The creation of a Synchronization Event (SE) requires two mechanisms. One to determine which clock cycles to designate as SEs, and one to provide the value of the IAR 110 and LR 108 registers at the point of the SE to the reconstruction software.

The present invention is implemented as follows:

1. 32-entry internal FIFO 102 is used to gather information that includes:
   A. Branch to Count Register (bcctr) targets and Move to Link Register (mtlr) values:
   Previous implementations (such as Ser. No. 760,553) gathered mtctr values instead of bcctr targets. By gathering bcctr targets the trace data volume is reduced since bcctr occurs less frequently than mtctr, and the only time the mtctr values are important for trace reconstruction is if the mtctr value is used as a bcctr target (as opposed to being used as an actual count value for a branch with decrement instruction). This reduces the data bandwidth (pin) requirements, and saves logic area and power. It also has the added benefit that the CTR data is no longer needed as a part of a Synchronizing Event (SE) (see below), further reducing data bandwidth requirements.

B. Interrupt vector codes and addresses:

As a part of the present implementation, the interrupt vector code—that is, a code that is broadcast on the Trace Status (TS) pins 119—is added to distinguish Interrupt vectors from mtlr values and bcctr targets. This is necessary since an interrupt can occur after a mtlr/bcctr is committed (destined to complete at some time; cannot be flushed) and reported on the ES pins 118, but the interrupt vector can be put into the FIFO 102 before the mtlr/bcctr value, and thus broadcast on the Trace Status (TS) pins 119 before the mtlr/bcctr. For this scenario, based on the listing of the software code, the trace software will be expecting the mtlr/bcctr value prior to the interrupt address, as suggested by the sequence of Execution Status (ES) codes. Unless the interrupt address is preceded by the interrupt "code", the trace software will misinterpret the interrupt address data as mtlr/bcctr data, and will not correctly reconstruct the trace.

C. Synchronizing Event (SE) codes, Cycle Counts, IAR 110 values, and LR 108 values (posted every N cycles to the internal trace FIFO 102):

This information is reduced for the present invention since the CTR value is no longer required as a part of the synchronizing event. This is another benefit of posting bcctr targets instead of mtctr, as described above, further reducing data volume and bandwidth requirements. In addition, the SE_IAR and SE_LR are now latched (see latch 113) at the time of a Synchronizing Event, then simultaneously posted together into the Trace FIFO 102. This reduces hardware complexity, since it is no longer possible to have other "normal" (that is, postings for mtlr, bcctr, and interrupts) events posting between the SE_IAR and SE_LR postings, and the SE_CTR is completely eliminated.

D. Codes to indicate the occurrence of an SE capture (of the IAR/LR) (known as a "fence" code) and Trigger Events (TE):

The "fence" code is added to indicate to the trace software that any mtlr/bcctr/interrupt values that are transmitted (via the TS pins 119) between the "fence" code and the SE code are associated with mtlr/bcctr instructions or interrupts that actually occurred after the Synchronizing Event (SE) occurred, but were posted before the SE_IAR/LR combination.

Additional background: Normal postings (again, mtlr, bcctr, and interrupts) are intentionally prioritized ahead of SE's for posting to the FIFO 102. If instead the SE posting "won" the priority then the CPU pipeline that is executing the mtlr/bcctr instruction would be stalled by one or more cycles, or interrupt latency would be increased, adversely affecting performance. This priority was also assigned in the previous designs. Flowever, in such previous designs, the IAR, LR, and CTR values were posted to the Trace buffer (or FIFO) directly from the IAR, LR, and CTR registers. Since the present implementation now captures the IAR 110 and LR 108 values (the CTR value is no longer needed) into latch 13 immediately at the time of the Synchronizing Event in order to post them to the FIFO 102 at a later time, then without the "fence" code the trace tool would be unable to correctly reconstruct the program trace if a mtlr/bcctr/interrupt that is subsequent to the SE actually posted to the FIFO 102 ahead of the SE_IAR/LR. In addition, the hardware must wait to post the "fence" code itself until any normal events that committed prior to the SE actually post to the FIFO 102. Otherwise, the trace software would interpret those normal events as ones that occurred after the SE, and would not reconstruct the trace correctly.

The Trigger Event gathering remains unchanged for this invention, but is mentioned here since it is part of the data collected into the Trace FIFO 102.

Additional "buffer" registers are used to count the number of branches and the total number of instructions that complete over a given 4-cycle period. Due to the superscalar nature of the present processor, as many as 16 instructions can complete in 4 cycles. Previous Trace solutions allowed for the completion of up to 2 instructions in a Trace cycle (where 1 Trace cycle=1 CPU cycle), the second of which had to be a "folded" branch.

2. The mechanism for broadcasting information from the internal Trace FIFO and Buffers assumes a 4:1 CPU to External Trace probe clock ratio, and includes the following outputs:

A. 5 Execution Status (ES) pins 118 defined in Table 1 below:

TABLE 1

| ES CODE | Meaning |
| --- | --- |
| 0xxxx | 0–15 (xxxx) committed ops (operations), no interrupt |
| 10000 | 16 committed ops, no interrupt |
| 1xxxx | 1–14 (xxxx) committed ops, 1 interrupt; xxxx <> 0,15 |
| 11111 | 0 committed ops, 1 interrupt |

As described previously, this allows for the simultaneous completion of up 16 instructions in a given Trace cycle (4 CPU cycle period). The previous Trace solutions allowed for the completion of up to two instructions in a Trace cycle, and for two instructions to complete simultaneously, one of them had to be a "folded" branch.

B. 3 Branch ES pins 120 to indicate up to three branch takens in a given Trace cycle (4 cycle period):

That is, up to three of the possible 16 completed instructions can be branches. In order to reconstruct the instruction flow, the Trace tool must know which branches are taken. The previous Trace solutions allowed for the completion of only 1 taken branch instruction in a given Trace cycle.

C. 7 Trace Status (TS) pins 119, defined by Table 2:

TABLE 2

| TraceStatus (0:6) | Trigger Event Type |
| --- | --- |
| 0000 000 | No activity |
| 0000 001 | Short LR/CTR broadcast to follow - 6 bits |
| 0000 010 | Short LR/CTR broadcast to follow - 12 bits |
| 0000 011 | Short LR/CTR broadcast to follow - 18 bits |
| 0001 000 | SE capture (fence) |
| 0010 000 | Interrupt broadcast to follow |
| 0011 000 | Wait, Debug Wait, Stop |
| 0100 000 | Trigger Event (TE) |
| 0101 000 | SE_IAR/LR broadcast to follow |
| 0110 000 | reserved (used to be SE_LR code) |
| 0111 000 | reserved (used to be SE_CTR code) |
| 1xxx xxx | Data broadcast; data = "xxx xxx". Data broadcasts are for interrupts, mtlr, bcctr (taken), SE_IAR, and SE_LR |
| All Unlisted | reserved |

Note that there is now a single SE_IAR/LR code that corresponds to the simultaneous posting of the SE_IAR and SE_LR. This differs from previous implementations that required separate SE_IAR, SE_LR, and SE_CTR codes that preceded the IAR, LR, and CTR values, respectively.

It is only necessary to gather and broadcast the lower order bits of the mtlr/bcctr values that are different from the last mltr/bcctr broadcast. In other words, if 24 of the 30 bits of the current bcctr target are the same as the last bcctr target, then only the low-order 6 bits need to be broadcast, preceded by a special code to indicate that only 6 bits were broadcast. There are 4 separate possibilities, including a full 30-bit broadcast, or 18, 12, or 6 bit broadcasts, as outlined in Table 2. This provides a significant reduction in data bandwidth (pin) requirements, as previous trace solutions always broadcast the entire 30-bit address.

Interrupt postings are preceded by a special interrupt code to prevent the reconstruction tool from confusing them with other normal (mltr, bcctr) postings. This is necessary since it is possible to post interrupts prior to posting mtlr/bcctr values which occurred prior to the interrupt (as described earlier), and the trace tool must be able to distinguish between interrupt vectors and mtlr/bcctr values in order to correctly reconstruct the execution path.

There are 6 bits for data broadcast (TraceStatus(1:6) or TS pins), as opposed to 3 bits used on previous implementations. This is a direct result of the increase in frequency (more than double) over the previous processor designs. Bit 0 (TraceStatus(0)) is used to indicate that an address is being broadcast on the other six TS bits, as opposed to a trace code.

D. 1 Synchronizing (clock) pin 121:

This pin enables an external collection device (a trace analyzer 91 (see FIG. 9)) to collect the Trace Data supplied on the other 15 Trace pins (ES, Branch ES, and TS) at a 4:1 CPU to Trace (Synchronizing) Clock ratio. This is necessary because of the inability of logic analyzers to capture data at the high CPU frequency (perhaps as high as 800 MHz for future offerings). The intent is to provide trace information at the most minimal possible frequency with a minimum of pins.

3. Limitations on instruction processing combinations include:

A. Limit the number of completing branches to 3 over a 4-cycle period. Otherwise, it would be possible to complete 5 branches over the same period. Limiting the number of branches that can complete to 3 over a 4-cycle period reduces the pin requirements for Branch Execution Status from 5 to 3, saving 2 pins, without adversely affecting performance.

B. Limit the number of interrupts to 1 over a 4-cycle period. Otherwise, it would be possible for 2 interrupts to occur over the same period. This limitation eliminates the need for an extra pin for reporting interrupts, without adversely affecting performance.

C. Prevent an interrupt from occurring when 15 or 16 instructions complete in the same 4-cycle period. This enables interrupt and instruction completion information to be encoded onto the 5 ES pins, as described in Table 1.

The exact information required to be broadcast depends on the architecture of the processor being traced. The present implementation example uses I/O pins to broadcast enough information to reconstruct a trace.

Figure 4:
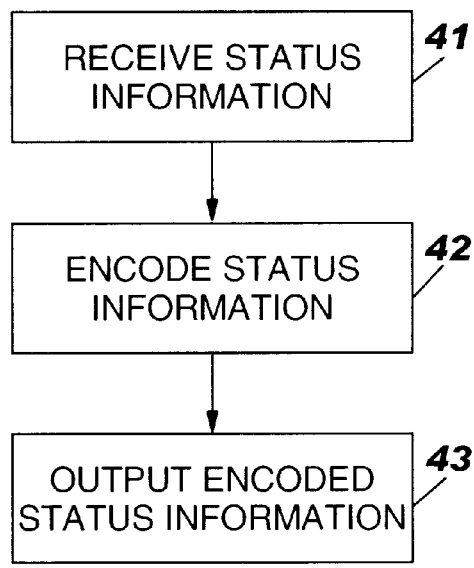
FIG. 4 illustrates a flow diagram of the transmission of status information.

Referring to FIG. 4, there is illustrated a flow diagram of how ES information is broadcast from IC 10. In step 41, status information is received from microprocessor 100 by control logic 103. Such status information may include the execution of one or more instructions, the direction of any executed branches, and the taking of any exception vectors. Next, in step 42, control logic 103 encodes the received status information using the encoding noted above in Table 1. Then, in step 43, this encoded execution status (ES) information is output along bus 105 through driver 107 onto pins 118 to the trace tool (see FIG. 9). This information is continuously provided on pins 118.

This ES information is sufficient to determine what instructions are executed and which ones are taken branches on each cycle. It is not enough to completely trace instructions within microprocessor 100. As noted above, the trace reconstruction software process has access to the object code that is being executed, so it can use the information provided on the ES pins 118 to follow in-line instructions and taken branches whose targets are specified by the instructions themselves. However, the trace reconstruction software must also be able to determine the value of the LR 108 register and the CTR 109 register during any clock cycle in which a branch to that target occurs, changes in program flow due to exceptions, when trigger events occur, and what the initial state of registers 108 and 110 are for the initial cycle of trace reconstruction (i.e., a specific SE occurrence).

Pins 119 are referred to as the trace status ("TS") pins, and are used to broadcast information that is required in addition to the cycle-by-cycle status provided by ES pins 118.

Referring back to FIG. 1, multi-word first-in-first-out ("FIFO") buffer 102 allows several broadcasts to be queued in the case of a "burst" of mtlr/bcctr instructions, i.e., the case of executing such an instruction before the previous broadcast is completed. If FIFO 102 is completely full when CPU 100 needs to make an entry to be broadcast, CPU 100 must halt execution (stall) until the oldest entry in FIFO 102 has been broadcast and removed from FIFO 102. Correct operation of the stall program and the ability to trace that program are assured in this case, but the user will see a performance degradation. Thus, while the depth of FIFO 102 is arbitrary with regard to correct logical function, too few locations will degrade performance, and too many locations will waste spaceon IC 10.

Figure 2:
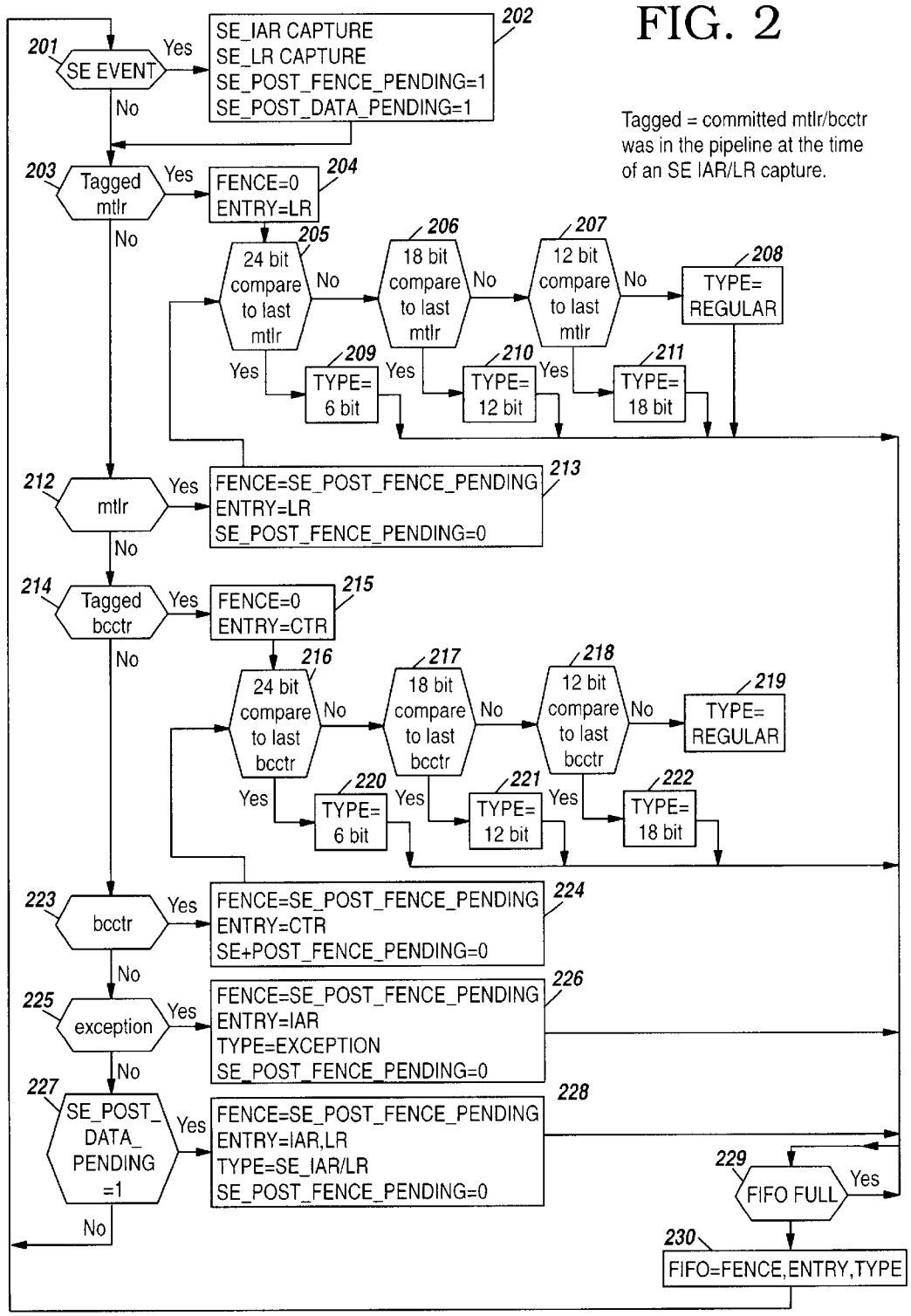
FIG. 2 illustrates a flow diagram of a loading of the FIFO utilized within one embodiment of the present invention.

Referring to FIG. 2, in step 201, there is a determination of whether an SE event has occurred. If not, the process proceeds to step 203. However, if an SE event has occurred, then in step 202, there is a capture of the SE_IAR value, a capture of the SE_LR value, and parameters SE_POST_FENCE_PENDING and SE_POST_DATA_PENDING are made equal to 1. The process then moves to step 203. In step 203, a determination is made whether there is a tagged mtlr. A tagged mtlr means that a committed (destined to complete at some time; cannot be flushed) mtlr/bcctr was in the pipeline at the time of an SE_IAR/LR capture. If there was a tagged mtlr in step 203, the process proceeds to step 204 to set the FENCE parameter equal to zero and the ENTRY parameter equal to LR. Thereafter, in step 205, a determination is made whether there was a 24-bit compare to the last mtlr. If yes, the process proceeds to step 209 to equate the TYPE parameter equal to 6 bit. If in step 205, there was not a 24-bit compare to the last mtlr, the process proceeds to step 206 to determine if there was an 18 bit compare to the last mtlr. If not, the process proceeds to step 207. If yes, the process proceeds to step 210 to designate the TYPE parameter equal to 12 bit. In step 207, a determination is made whether a 12-bit compare to the last mtlr occurred. If not, the process proceeds to step 208 to designate the TYPE parameter equal to REGULAR. If yes, the process proceeds to step 211 to designate the TYPE parameter equal to 18 bit. Steps 208–211 all then proceed to step 229 discussed below.

If in step 203 it is determined that there is not a tagged mtlr, the process proceeds to step 212 to determine if an mtlr instruction has been executed in CPU 100. If yes, the process proceeds to step 213 to designate the FENCE parameter equal to the SE_POST_FENCE_PENDING parameter, the ENTRY parameter equal to LR, and then the SE_POST_FENCE_PENDING parameter is reset equal to zero. Step 213 then proceeds to step 205 described above. If in step 212, an mtlr instruction has not been executed, the process proceeds to step 214 to determine if a tagged bcctr has occurred. If yes, the process proceeds to step 215 to designate the FENCE parameter equal to zero and the ENTRY parameter equal to CTR.

Thereafter, in step 216, a determination is made whether there was a 24-bit compare to the last bcctr. If yes, the process proceeds to step 220 to equate the TYPE parameter equal to 6 bit. If in step 216, there was not a 24-bit compare to the last bcctr, the process proceeds to step 217 to determine if there was an 18-bit compare to the last bcctr. If not, the process proceeds to step 218. If yes, the process proceeds to step 221 to designate the TYPE parameter equal to 12 bit. In step 218, a determination is made whether a 12-bit compare to the last bcctr occurred. If not, the process proceeds to step 219 to designate the TYPE parameter equal to REGULAR. If yes, the process proceeds to step 222 to designate the TYPE parameter equal to 18 bit. Steps 219–222 all then proceed to step 229 discussed below.

If in step 214 it is determined that there is not a tagged bcctr, then the process proceeds to step 223 to determine if a bcctr instruction has been executed. If yes, the process proceeds to step 224 where the FENCE parameter is set equal to the SE_POST_FENCE_PENDING parameter, the ENTRY parameter is set equal to CTR, and the SE_POST_FENCE_PENDING parameter is reset equal to zero. From step 224, the process proceeds to step 216, described above.

If in step 223, a bcctr instruction has not executed, the process proceeds to step 225 to determine if an exception has occurred. If yes, the process proceeds to step 226 where the FENCE parameter is set equal to the SE_POST_FENCE_PENDING parameter, the ENTRY parameter is set equal to IAR, the TYPE parameter is set equal to EXCEPTION, and the SE_POST_FENCE_PENDING parameter is reset equal to zero. The process proceeds from step 226 to step 229.

If in step 225, an exception has not occurred, the process proceeds to step 227 to determine if SE_POST_DATA_PENDING is equal to one. If not, the process returns to step 201. If yes, the process proceeds to step 228 to set the FENCE parameter equal to the SE_POST_FENCE_PENDING parameter, the ENTRY parameter equal to IAR and LR, the TYPE parameter equal to SE_IAR/LR, the SE_POST_FENCE_PENDING parameter equal to zero, and the SE_POST_DATA_PENDING parameter reset equal to zero. The process proceeds from step 228 to step 229.

The process in step 229 determines whether FIFO 102 is full; if so, step 229 will be recycled until FIFO 102 is not full when the process will proceed to step 216 to enter the FENCE, ENTRY and TYPE into FIFO 102.

Figure 5:
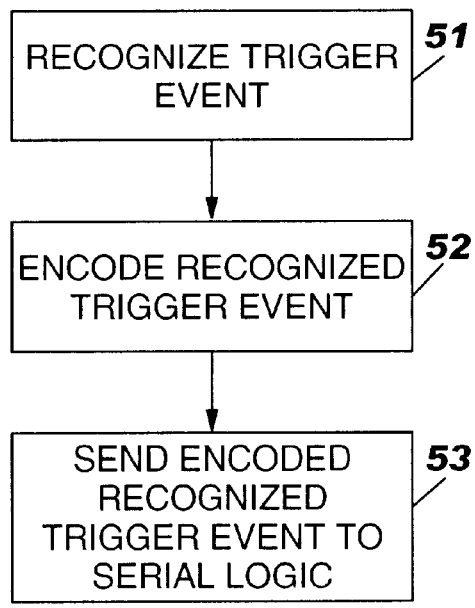
FIG. 5 illustrates a flow diagram of the encoding of a trigger event.

Microprocessor 100 includes hardware to recognize certain TEs including, but not limited to, the execution of certain instructions or access of data at predefined addresses stored in dedicated registers on microprocessor 100. Essentially, a user sets up a trace by directing the circuitry within chip 10 to broadcast a TE when certain conditions occur. This is performed by control logic 103 monitoring such addresses and control within microprocessor 100 and performing a comparison with an event designated by the user through debug circuit 104. Referring to FIG. 5, this process begins with step 51 where a TE is recognized. Then, in step 52, the recognized TE is encoded as shown in Table 2 above. In step 53, this encoded recognized TE is sent to serial logic 115 for broadcast on pins 119. Generally, the external acquisition system will recognize the symbol for the TE and cause the external trace buffer (see FIG. 8) to save data in the temporal vicinity of the TE. For example, if one uses a logic analyzer 91 (see FIG. 9) with a buffer depth of 2000 clocks to capture the trace data, one might program analyzer 91 to save the data from the clocks from 1000 clocks before the TE until 1000 clocks after the TE. The broadcast of the TE is a little different than the broadcast of all the other information on TS pins 119 in that it does not enter FIFO 102. Instead, the code (0100 000) for the TE is placed on TS pins 19 in the clock cycle immediately after the clock cycle in which the TE is recognized. And, if data is in the process of being broadcast from FIFO 102, that broadcast is deferred for the one clock cycle occupied by the broadcast of the TE code. This policy allows the TE to be related directly to the data on ES pins 118 so that the reconstruction software can discern what instruction was executing when the TE was signaled.

Figure 3:
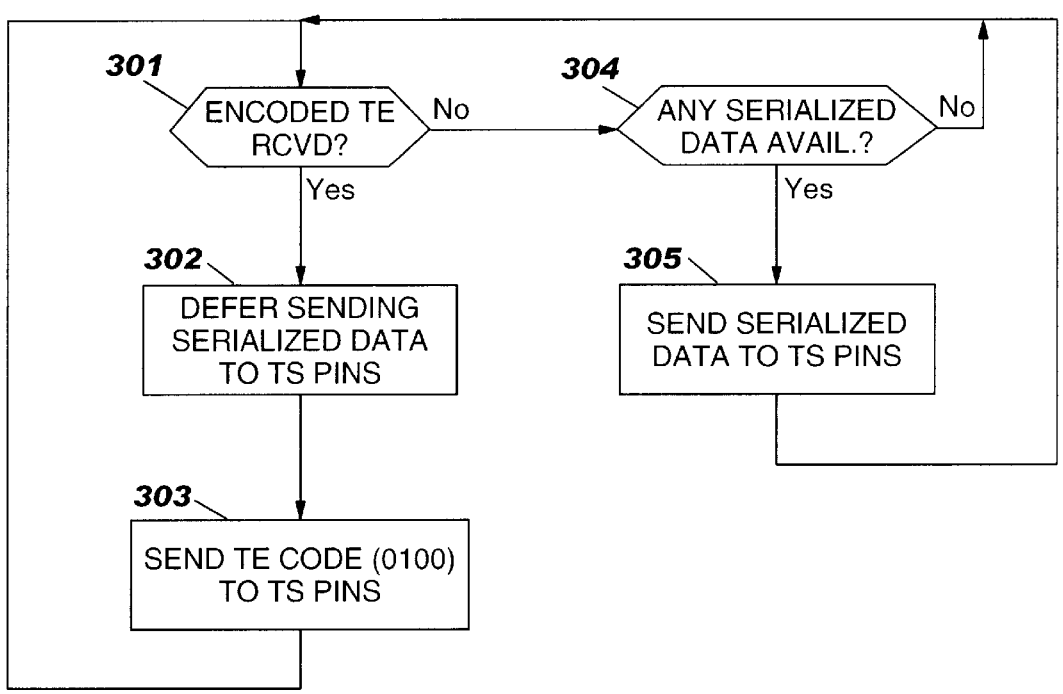
FIG. 3 illustrates a flow diagram of sending TE and serialized FIFO output information to the TS pins.

Referring next to FIG. 3, there is illustrated a flow diagram of this process implemented within serial logic 115. The process proceeds to step 301 to determine whether or not an encoded TE has been received from control logic 103. If not, the process forwards to step 304. However, if an encoded TE has been received, then the process proceeds to step 302 wherein sending of serialized data to TS pins 119 is deferred. Then in step 303, the encoded TE signal is sent on pins 119.

In step 304, a determination is made whether there is any serialized data available to send onto TS pins 119. If not, the process returns to step 301. However, if there is serialized data available, the process proceeds to step 305 to send this serialized data to TS pins 119. The process then returns to step 301.

SE information is also broadcast on TS pins 119 using FIFO 102 in the same manner as information regarding mtlr, bcctr targets, and exception vectors are. In one embodiment, SEs are generated periodically by control logic 103 in response to a continuously running counter 120, which may be clocked by the same clock as CPU 100. Alternatively, the SEs could be generated by some other means such as an external input.

Whenever the value of SE counter 120 matches a predetermined value (e.g., 0), an SE is generated.

All broadcasts of SE addresses are preceded by codes on TS pins 119 that identify the types of the broadcast. The specific encoding of pins 119, including encoding of TEs and other events, may be as shown in Table 2 above.

When the IAR 110 value for the SE is placed into FIFO 102, offset counter 122 begins counting up from 0. When the IAR 110 value for the SE is to be broadcast from FIFO 102, the value of offset counter 122 is broadcast after the IAR SE code and before the IAR address data. Since the value of the offset counter 122 is the number of cycles since the SE was placed into FIFO 102, the reconstruction software can relate the cycle on which the IAR broadcast appears on TS pins 119 to the cycle in which the SE entered FIFO 102. Hence, it can determine the IAR 110 value associated with a specific cycle of data from ES pins 118, and begin trace reconstruction from that cycle.

Figure 7:
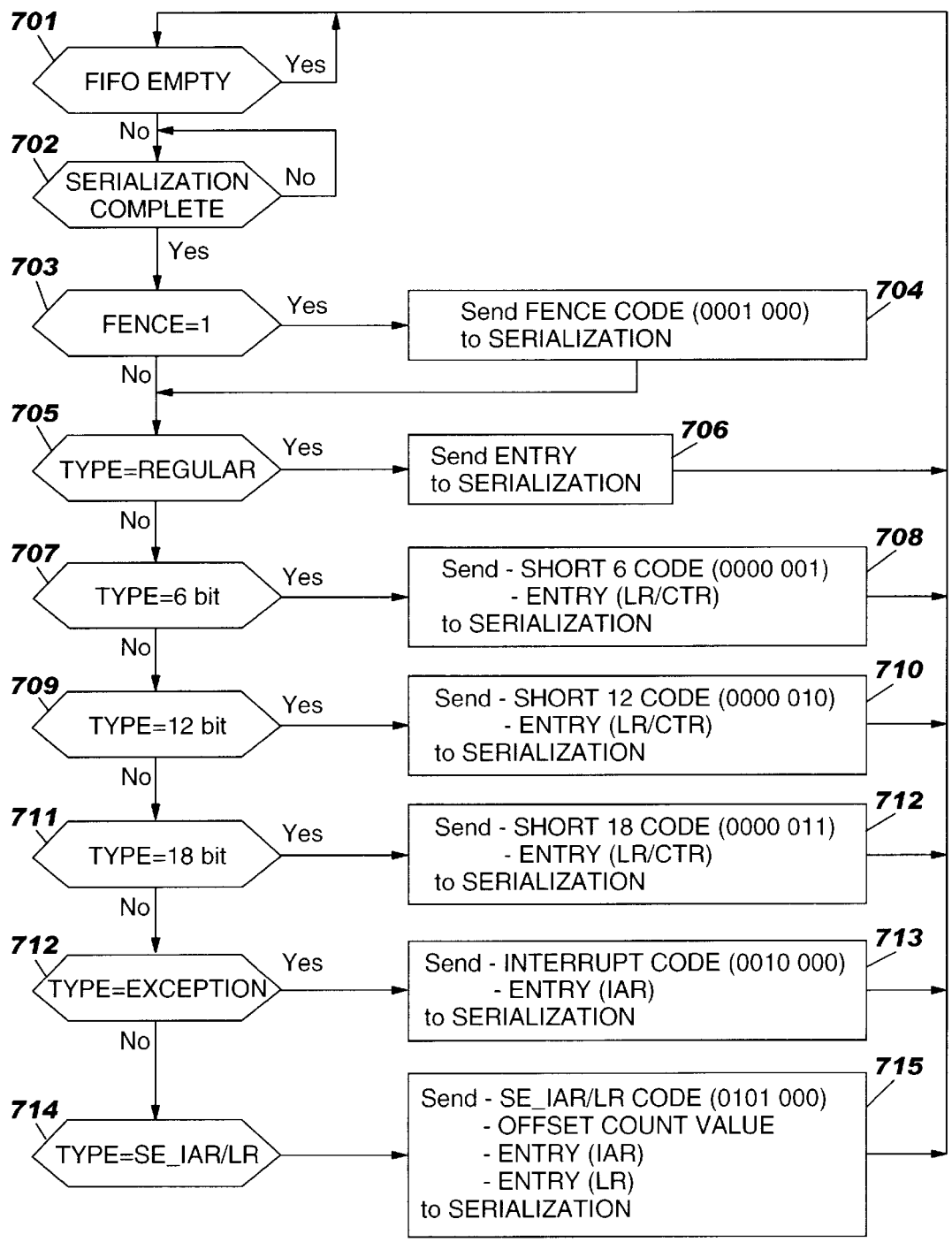
FIG. 7 illustrates a flow diagram of the transmission of data to the FIFO.

Referring next to FIG. 7, there is illustrated a flow diagram of this process, which may be implemented within control logic 103. In step 701, a determination is made whether FIFO 102 is empty. If yes, the process simply returns upon itself. However, if FIFO 701 is not empty, then in step 702, a determination is made whether the previous serialization has been completed. If not, the process recycles upon itself. However, if the previous serialization is complete, the process proceeds to step 703. In step 703, a determination is made whether the FENCE parameter is equal to one. If yes, the process proceeds to step 704 to send the FENCE code (0001 000) to the serialization logic. Both steps 703 and 704 then proceed to step 705. Then in step 705, if the TYPE is REGULAR (see FIG. 2), the process proceeds to step 706 to send the ENTRY for serialization and transmission along TS pins 119. The process then returns to step 701.

However, if in step 705 the TYPE is not REGULAR, the process proceeds to step 707 to determine whether the TYPE is equal to 6 bit. If yes, the process proceeds to step 708 to send the SHORT 6 code (0000 001) and the ENTRY (LR/CTR) to serialization logic 115 (see FIG. 3).

If in step 707, the TYPE is not equal to 6 bit, the process proceeds to step 709 to determine whether the TYPE is equal to 12 bit. If yes, then in step 710, the SHORT 12 code (0000 010) and the ENTRY (LR/CTR) are sent to serialization logic 115 (see FIG. 3).

If in step 709, the TYPE is not equal to 12 bit, then the process proceeds to step 711 to determine whether the TYPE is equal to 18 bit. If yes, the process proceeds to step 712 to send the SHORT 18 code (0000 011) and the ENTRY (LR/CTR) to serialization logic 115 (see FIG. 3).

If in step 711, the TYPE is not equal to 18 bit, the process proceeds to step 712 to determine if the TYPE is equal to EXCEPTION. If yes, the process proceeds to step 713 to send the INTERRUPT code (0010 000) and the ENTRY (IAR) to the serialization logic 115. If in step 712, the TYPE is not equal to EXCEPTION, the process proceeds to step 714 to set the TYPE equal to SE_IAR/LR, and then in step 715, the SE_IAR/LR code (0101 000), the OFFSET COUNT VALUE, the ENTRY (IAR) and the ENTRY (LR) are sent to the serialization logic 115. The process returns to step 701.

The following analyzes the relationship of an SE, the external trace acquisition buffer depth and the minimum number of cycles before the desired TE for which a trace can be reconstruction.

As noted above, it is desirable to begin trace reconstruction on some cycle before the TE. Trace reconstruction can begin with any cycle held in the trace acquisition buffer 91 for which one can determine the initial state of the machine, i.e., the contents of IAR 110 and LR 108. These cycles are those previously designated as synchronizing events ("SEs").

The problem, then, is to guarantee the generation of an SE cycle some number of cycles before an event of interest, that is, the trigger event. Then one can trace from the SE to the TE, effectively tracing the CPU operation before the TE.

Figure 8:
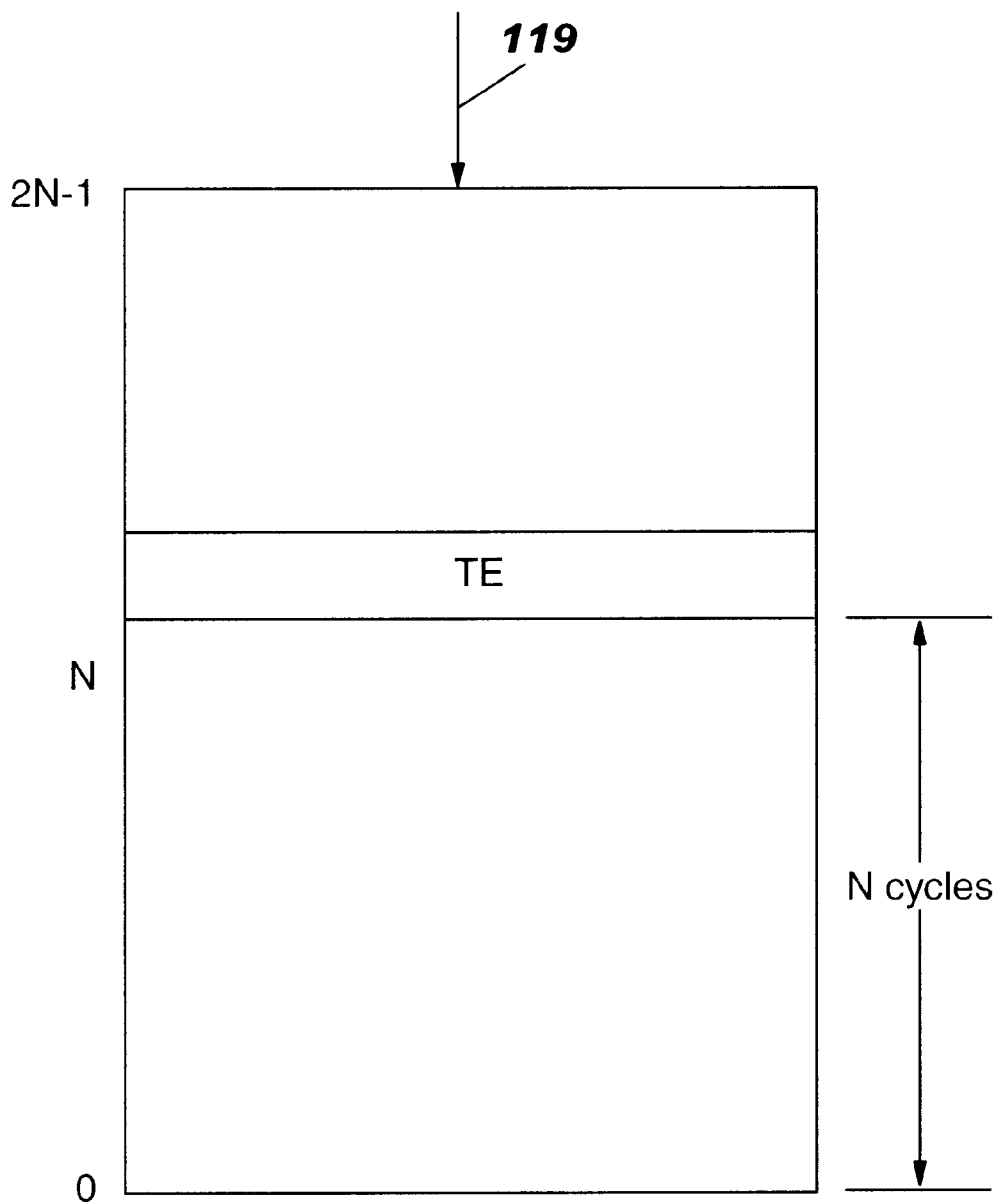
FIG. 8 illustrates a trace acquisition buffer.

Referring next to FIG. 8, there is shown one example of trace acquisition buffer 91 shown in FIG. 9. In order to guarantee that there is even an SE in trace buffer 91 at all, the periodicity of the SEs should be less than or equal to the depth of trace buffer 91. For example, if trace buffer 91 has some number of entries N, and the SEs occur every N cycles, a simple implementation might be to capture blocks of N clocks beginning with each SE cycle, and retaining the block for reconstruction if the desired TE is detected within the saved block. This solution may not guarantee any arbitrary number of clocks to be traced before the occurrence of the TE, since the TE may be at or near the beginning of the period between start cycles.

One alternative solution is to cause a periodic SE frequently enough to insure that multiple SEs will be evenly distributed in trace acquisition buffer 91. Note that a trace can be reconstructed beginning from any of them. As an example, suppose that an SE is generated every N cycles, and the depth of trace acquisition buffer 91 is 2N. If the buffer 91 locations are designated from 0 to 2N−1, and it is assumed that the trace entries are kept in temporal order from 0 to 2N−1 as well, and the data at location 2N−1 is that which is collected in the last cycle, and the data in location 0 is that which is collected 2N cycles previous, then after a TE is recognized, trace buffer 91 stops acquiring new data when the older SE reaches location 0. Then there will be 2 SEs in buffer 91, one at location 0 (the oldest instruction) and one at location N, or about halfway through buffer 91. TE is captured somewhere in the second half of buffer 91, and since one can trace from the older SE to the end of buffer 91, the ability to trace at least N cycles before the TE is guaranteed.

More generally, if an SE is caused every N cycles, and there is a trace buffer depth of mN, then the ability to trace up to (m−1)N cycles before the TE may be guaranteed.

Referring next to FIG. 9, there is illustrated an example of a trace tool coupled to pins 118 and 119. Trace acquisition buffer 91 is coupled to debugging workstation and supporting software 92. Any well-known trace tool may be used to capture the appropriate trace information in the manner set forth herein, and a reconstruction algorithm can be used to reconstruct the code flow from the captured trace information. A typical trace tool might interface to debug logic 104 via an IEEE Std. 1149.1–1990 Std. Interface (JTAG 117), and would monitor trace pins 118 and 119.

Figure 6:
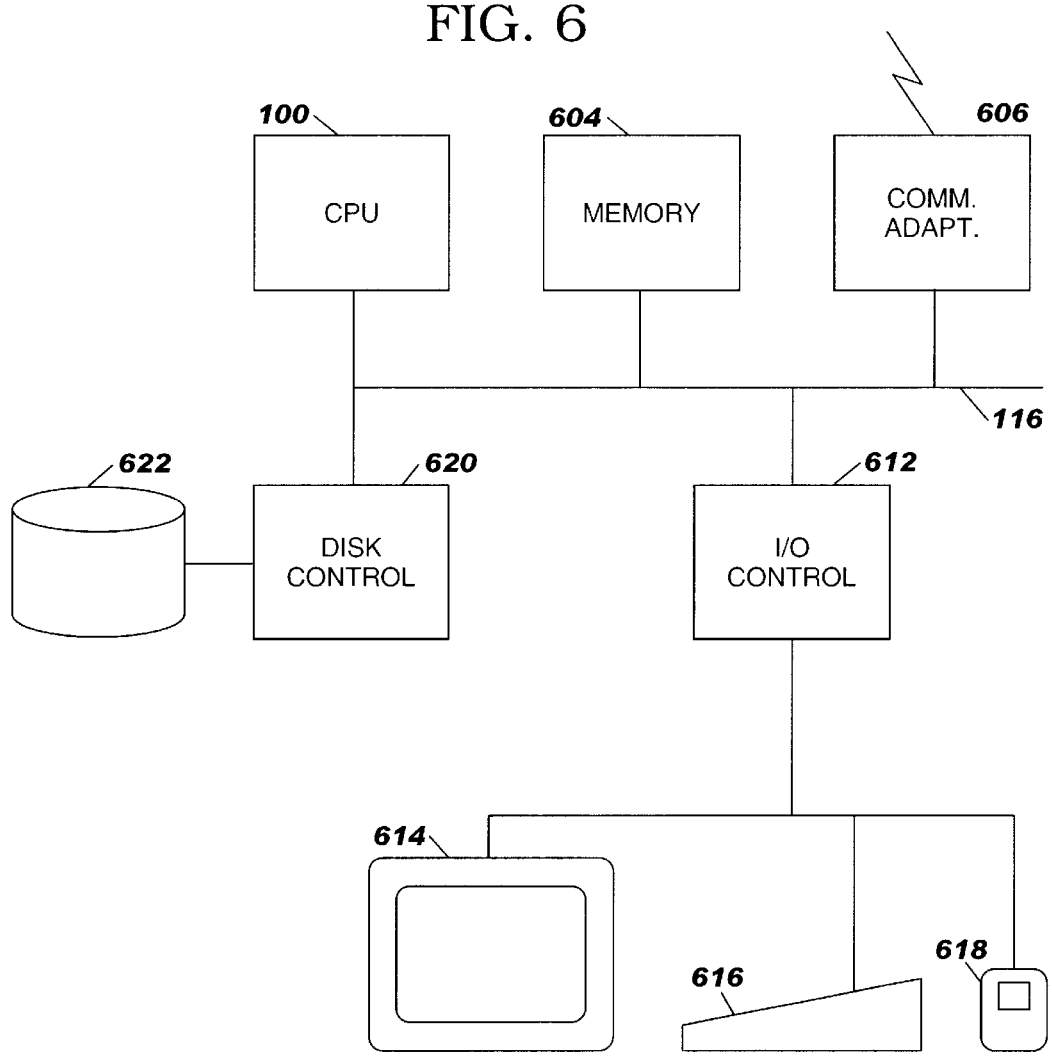
FIG. 6 illustrates a data processing system employing an embodiment of the present invention or of a debugging workstation.

Referring next to FIG. 6, there is illustrated a data processing system operable for implementing the present invention. Processor 100 is coupled via bus 116 to random access memory 604, permanent storage 622, optional communications adapter 606, which enables communication with other systems, input/output controller 612, which controls interaction with video display 164, keyboard 616, pointing device 618, disk controller 620, which controls interaction between processor 100 and permanent storage 622. The devices disclosed are typically available components. A removable diskette or an optical drive could be used in place of a magnetic drive for permanent storage 622 and processor 100 could be comprised of a number of processing engines in a multiprocessor or parallel processing architecture.

Although the present invention and its advantages have been described in detail, it should be understood that various changes, substitutions and alterations can be made herein without departing from the spirit and scope of the invention as defined by the appended claims.

What is claimed is:

1. A method for tracing instructions executing in a processor, comprising the steps of:

determining when a branch to count register ("bcctr") instruction executes in the processor;

temporarily storing a target address of the bcctr instruction in a trace buffer;

outputting the target address of the bcctr instruction from the trace buffer for use by a trace analyzer coupled to the processor; and capturing values, when a synchronizing event occurs, of an instruction address register and a link register, and asserting a fence code, wherein the fence code indicates that the bcctr instruction occurred subsequent to the synchronizing event.

2. The method as recited in claim 1, further comprising the step of:

negating the fence code if the bcctr instruction was committed prior to the synchronizing event.

3. The method as recited in claim 2, further comprising the steps of:
   determining when a move to link register ("mtlr") instruction executes in the processor;
   temporarily storing a register value of the mtlr instruction in the trace buffer;
   outputting the register value of the mtlr instruction from the trace buffer for use by the trace analyzer coupled to the processor;
   when a synchronizing event occurs, capturing values of the instruction address register and the link register, and asserting the fence code, wherein the fence code indicates that the mtlr instruction occurred subsequent to the synchronizing event; and
   negating the fence code if the mtlr instruction is committed.

4. The method as recited in claim 2, further comprising the steps of:
   determining when an interrupt executes in the processor;
   temporarily storing a register value of a interrupt target address in the trace buffer;
   outputting the register value of the interrupt target address from the trace buffer for use by the trace analyzer coupled to the processor; and
   when the synchronizing event occurs, capturing values of the instruction address register and the link register, and asserting the fence code, wherein the fence code indicates that the interrupt occurred subsequent to the synchronizing event.

5. The method as recited in claim 4, outputting an interrupt code from the processor for use by the trace analyzer when the interrupt is executed.

6. The method as recited in claim 1, further comprising the step of:
   simultaneously posting the values of the instruction address register and link register to the trace buffer.

7. A method for tracing instructions executing in a processor, comprising the steps of:
   determining when a branch to count register ("bcctr") instruction executes In the processor;
   temporarily storing a target address of the bcctr instruction in a trace buffer;
   outputting the target address of the bcctr instruction from the trace buffer for use by a trace analyzer coupled to the processor;
   comparing the target address of the bcctr to a target address of a previously executed bcctr; and
   only outputting from the processor for use by the trace analyzer those bits of the target address of the bcctr that are different than the target address of the previously executed bcctr.

8. The method as recited in claim 7, wherein a code is generated and output from the processor before outputting those bits of the target address of the bcctr that are different than the target address of the previously executed bcctr, wherein the code indicates that those bits are the only bits different from the target address of the previously executed bcctr.

9. A method for tracing instructions executing in a processor, comprising the steps of:
   when a synchronizing event occurs in the processor, capturing values of an instruction address register and a link register, and asserting a fence code;
   determining when a move to link register ("mtlr") instruction executes in the processor;
   temporarily storing a register value of the mtlr instruction in a trace buffer;
   outputting the register value of the mtlr instruction and the fence code from the trace buffer for potential use by a trace analyzer coupled to the processor, wherein the fence code indicates that the mtlr instruction occurred subsequent to the synchronizing event.

10. The method as recited in claim 9, further comprising the step of:
    simultaneously posting the values of the instruction address register and link register to the trace buffer.

11. The method as recited in claim 9, further comprising the steps of:
    comparing the register value of the mtlr instruction to a register value of a previously executed mtlr instruction; and
    only outputting from the processor those bits of the register value of the mtlr instruction that are different than the register value of the previously executed mtlr instruction.

12. The method as recited in claim 11, wherein a code is generated and output from the processor before outputting those bits of the register value of the mtlr instruction that are different than the register value of the previously executed mtlr instruction, wherein the code indicates that those bits are the only bits different from the register value of the previously executed mtlr instruction.

13. The method as recited in claim 9, further comprising the step of:
    negating the fence code if the mtlr instruction was committed prior to the synchronizing event.

14. A processor comprising:
    a superscalar instruction pipeline operable for executing multiple instructions in parallel;
    circuitry for determining when a branch to count register ("bcctr") instruction executes in the pipeline;
    a trace buffer for temporarily storing a target address of the bcctr instruction;
    an output drier coupled to the trace buffer for outputting the target address of the bcctr instruction from the trace buffer for use by a trace analyzer operably coupled to the processor;
    a latch for capturing values, when a synchronizing event occurs, of an instruction address register and a link register; and
    circuitry for asserting a fence code, wherein the fence code indicates that the bcctr instruction occurred subsequent to the synchronizing event.

15. The processor as recited in claim 14, further comprising:
    circuitry for negating the fence code if the bcctr instruction was committed prior to the synchronizing event.

16. The processor as recited in claim 14, further comprising:
    circuitry for simultaneously posting the values of the instruction address register and link register to the trace buffer.

17. A processor comprising:
    a superscalar instruction pipeline operable for executing multiple instructions in parallel;
    circuitry for determining when a branch to count register ("bcctr") instruction executes in the pipeline;
    a trace buffer for temporarily storing a target address of the bcctr instruction;

an output driver coupled to the trace buffer for outputting the target address of the bcctr instruction from the trace buffer for use by a trace analyzer operably coupled to the processor;

circuitry for comparing the target address of the bcctr to a target address of a previously executed bcctr; and circuitry for only outputting from the processor those bits of the target address of the bcctr that are different than the target address of the previously executed bcctr.

18. The processor as recited in claim 17, wherein a code is generated and output from the processor before outputting those bits of the target address of the bcctr that are different than the target address of the previously executed bcctr, wherein the code indicates that those bits are the only bits different from the target address of the previously executed bcctr.

19. A processor comprising:

a superscalar instruction pipeline operable for executing multiple instructions in parallel;

circuitry for asserting a fence code when a synchronizing event occurs in the processor;

circuitry for determining when a move to link register ("mtlr") instruction executes in the pipeline;

a trace buffer operable for temporarily storing a register value of the mtlr instruction;

a serial driver operable for outputting the register value of the mtlr instruction and the fence code from the trace buffer for potential use by a trace analyzer coupled to the processor, wherein the fence code indicates that the mtlr instruction occurred subsequent to the synchronizing event.

20. The processor as recited in claim 19, further comprising:

circuitry for comparing the register value of the mtlr instruction to a register value of a previously executed mtlr instruction; and circuitry for only outputting from the processor those bits of the register value of the mtlr instruction that are different than the register value of the previously executed mtlr instruction.

21. The processor as recited in claim 20, wherein a code is generated and output from the processor before outputting those bits of the register value of the mtlr instruction that are different than the register value of the previously executed mtlr instruction, wherein the code indicates that those bits are the only bits different from the register value of the previously executed mtlr instruction.

22. The processor as recited in claim 19, further comprising:

circuitry for negating the fence code if the mtlr instruction was committed prior to the synchronizing event.

23. A method for tracing instructions executing in a processor, comprising the steps of:

determining when a branch to count register ("bcctr") instruction executes in the processor;

comparing a target address of the bcctr to a target address of a previously executed bcctr; and only outputting from the processor for use by a trace analyzer those bits of the target address of the bcctr that are different than the target address of the previously executed bcctr.

24. The method as recited in claim 23, wherein a code is generated and output from the processor before outputting those bits of the target address of the bcctr that are different than the target address of the previously executed bcctr, wherein the code indicates that those bits are the only bits different from the target address of the previously executed bcctr.

25. A processor comprising:

a superscalar instruction pipeline operable for executing multiple instructions in parallel;

circuitry for determining when a move to link register ("mtlr") instruction executes in the pipeline;

a trace buffer operable for temporarily storing a register value of the mtlr instruction;

circuitry for comparing the register value of the mtlr instruction to a register value of a previously executed mtlr instruction; and circuitry for only outputting from the processor those bits of the register value of the mtlr instruction that are different than the register value of the previously executed mtlr instruction.

26. The processor as recited in claim 25, wherein a code is generated and output from the processor before outputting those bits of the register value of the mtlr instruction that are different than the register value of the previously executed mtlr instruction, wherein the code indicates that those bits are the only bits different from the register value of the previously executed mtlr instruction.

* * * * *